May 3, 1966     J. D. WISNOM     3,248,740

FORAMINOUS URINAL SCREEN

Filed March 31, 1964

INVENTOR.
JOHN D. WISNOM
BY *Moses, McGlew and Toren*
ATTORNEYS

United States Patent Office
3,248,740
Patented May 3, 1966

3,248,740
FORAMINOUS URINAL SCREEN
John D. Wisnom, 2135 Parkside Ave.,
Hillsborough, Calif.
Filed Mar. 31, 1964, Ser. No. 356,242
11 Claims. (Cl. 4—109)

This invention relates to screens or waste trap strainers for urinals and, more particularly, to an inexpensive disposable urinal screen or strainer having incorporated therein a self-hardening deodorant solution.

Urinal screens are provided for straining purposes in order to prevent debris, such as cigarette butts and the like, from entering the trap and plumbing associated with the urinal and thus blocking the urinal. As hitherto used, such screens have usually been made of metal. In some cases, the screens are used to support a block or preformed mass of a deodorant material, this deodorant material either being laid on top of the screen or being suspended therefrom.

The screens presently in use must be removed for cleaning, and this is generally a distasteful job. In addition, due to the normal attrition accompanying the use of a urinal, the block or mass of disinfectant is rapidly eroded away. Furthermore, a metal screen, unless it is of a very high corrosion-resistant alloy, becomes corroded after a relatively short period of use, so that the screen must be replaced.

Considering all of these factors, there is a long felt need for a urinal screen or strainer which would be relatively inexpensive, would have a relatively long life, and which would not involve rapid erosion of deodorant material. Additionally, it would be desirable to have a screen which is sufficiently inexpensive that it could economically be thrown away or disposed of after a relatively short period of use.

Accordingly, an object of the present invention is to provide an inexpensive and disposable urinal screen.

A further object is to provide such a screen which is made of material capable of retaining liquid within its structure, and which retains therein a hardenable solution of a deodorant.

Still a further object of the invention is to provide a screen constructed to retain a hardenable deodorant solution within its structure, whereby the hardenable deodorant will stiffen the screen in the event the latter is made of flexible or pliant material.

Still a further object of the invention is to provide a disposable urinal screen comprising a foraminated sheet of liquid retaining character such as, for example, a sponge-type or foamed-type material.

Another object of the invention is to provide a disposable urinal screen comprising a foraminated sheet of absorbent material.

Still another object of the invention is to provide a disposable urinal screen comprising a foraminated sheet which is formed by warp and weft members which have a tubular, or other similar, construction adapted to retain a hardenable deodorant solution therewithin.

For an understanding of the principles of the invention, reference is made to the following description of typical embodiments thereof as illustrated in the accompanying drawings.

Figure 1:
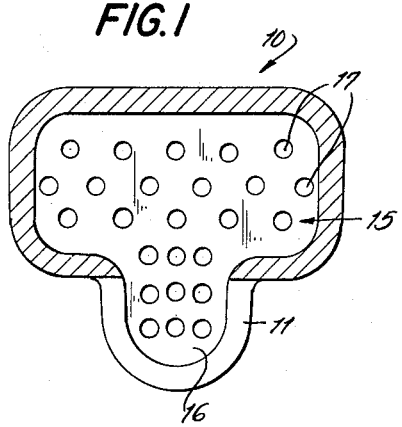
FIG. 1 is a part plan and part horizontal sectional view of a urinal illustrating a screen, embodying the invention, as positioned therein for straining purposes.

Referring to the drawings, FIG. 1 illustrates a known form of urinal 10 having a strainer or screen 15, embodying the invention, mounted therein and above the drain or trap of the urinal. Urinal 10 may have the usual forward extension 11, and screeen 15 is formed with an extension 16 for covering or entering into forward extension 11. As illustrated, screen 15 is a substantially flat foraminated sheet having apertures 17 for flow of liquid therethrough, while retaining solids or semi-solids on its upper surface.

As stated, the screen may be formed of many different materials, all of which have the common property of being foraminated and capable of retaining liquid within their structures, and all having a hardenable deodorant solution retained within the structure and stiffening the screen. One type of material which may be used is a foamed or sponge material. Examples of such foamed materials are foamed rubber, foamed synthetic resin, and the like. Sponge materials include plastic or natural rubber sponges, or wood sponges.

Figure 2:
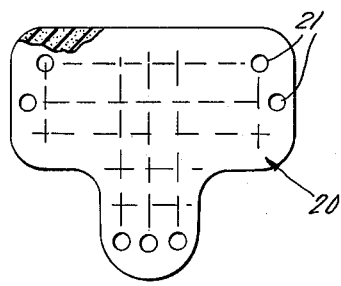
FIG. 2 is a plan view of one form of screen embodying the invention.

A sponge or foamed type of screen is illustrated as 20 in FIG. 2 as formed with apertures 21 therethrough. In FIG. 2, sheet 20 is substantially planar and is foraminated by the apertures 21. The material of sheet 20 may be plastic foam, rubber foam, plastic sponge, rubber sponge, wood sponge, or any similar material having pores or the like which can retain hardenable deodorant solution.

In making screen 20, the latter is cut to the proper shape for fitting a urinal 10, and the screen is then dipped in a hardenable solution of a deodorant which, upon drying, becomes hard and stiffens the sheet. A suitable deodorant of this type is para-dichlorbenzene. The para-dichlorbenzene enters into the interstices or pores of the sheet 20 and hardens therein to stiffen the sheet.

Figure 3:
FIG. 3 is a partial transverse sectional view illustrating another form of screen embodying the invention.

FIG. 3 is a cross sectional view of a sheet which, in plan, would have the same general shape as the sheet 20 of FIG. 1. The sheet 25 of FIG. 2 is a wood fiber sheet which is given the desired planar shape and formed with holes therethrough. These holes are indicated at 26. The wood fiber screen is then dipped into the mentioned hardenable solution, or an equivalent hardenable deodorant solution, after which the screen may be compressed with the hardenable deodorant solution filling the pores or air spaces in the wood fiber so that the wood fiber screen is substantially impregnated with the hardenable deodorant solution. As the deodorant solution hardens, it stiffens the screen 25.

Figure 4:
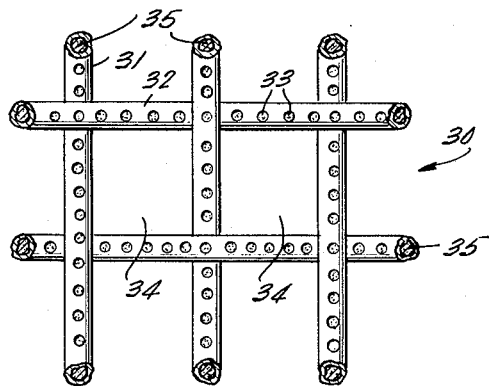
FIGS. 4 and 5 are partial plan views of screens embodying alternative embodiments of the invention, namely screens formed of intersecting tubular warp and weft members.

FIG. 4 illustrates a different form of screen. In this case, the screen 30 is formed by intersecting tubular members 31 and 32 which are essentialy warp and weft members woven together to leave fairly substantial open areas or interstices 34 between the tubes. The tubes 31 and 32 are formed with apertures 33 therealong opening between the interior of the tube and the exterior thereof. After being formed, and with the tubes 31 and 32 preferably united with or anchored to each other at their intersections, the completed screen is dipped in a hardenable deodorant solution which enters into the interior of tubes 31 and 32 and into pores or openings 33, where it hardens, as indicated at 35, to stiffen the screen 30. Thus, the tubes 31 and 32 need not be rigid tubes, but may be flexible, whereby the assembly operation thereof to form the screen 30 is facilitated. Nevertheless, the hardening of the deodorant material 35 within the tubes stiffens these tubes so as to form a self-supporting screen 30.

Figure 5:
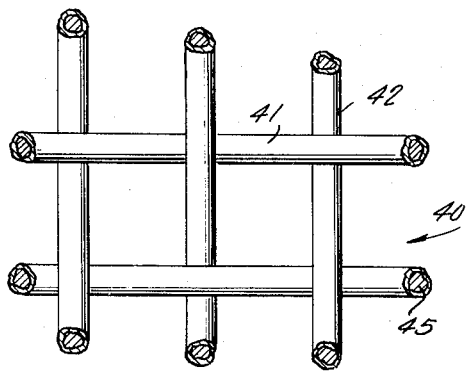

FIG. 5 illustrates an alternative arrangement for forming a screen 40. In this case, the intersecting tubes 41 and 42 are porous but not perforated. However, when the tubes are dipped into a hardenable deodorant solution, this solution 45 enters tubes 41 and 42 and hardens therein, thereby stiffening the tubes to form a self-supporting screen 40.

Figure 6:
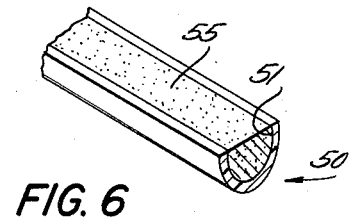
FIG. 6 is a partial perspective and sectional view of a warp or weft member illustrating a modified form thereof.

A modified form of the warp and weft members of the screen shown in FIG. 5 is best illustrated in FIG. 6. In this case, a flexible warp or weft member 50 is made in the form of a channel or through having groove 51 extending longitudinally thereof and having a substantial depth. When a screen formed of members 50 is dipped into a hardenable deodorant solution, the solution fills channels 51 and hardens to provide a hardened deposit of the deodorant within these channels, as indicated at 55. This hardened deposit also serves to help stiffen elements 50 of the screen.

In each of the embodiments of the invention, it will be noted that the hardenable deodorant solution enters into pores or the like of the members whereby it is retained in place and protected against the normal attrition due to customary use of the urinal. Of course, the deodorant will gradually evaporate so that, after a pre-set time interval, it will no longer be present within the screen. However, the material of which the screens are made is sufficiently inexpensive, as are also the manufacturing and assembling operations, that the resultant product can be commercialized at a price which is attractively low enough so that the screens may be sold as disposable screens which may be thrown away after a given period of use. Such disposal of the screens eliminates the distasteful operation of cleaning the screens.

While para-dichlorbenzene has been mentioned as a suitable self-hardening deodorant solution, it should be understood that this is by way of example only and that other materials having similar properties may be used.

While specific embodiments of the invention have been shown and described in detail to illustrate the application of the principles of the invention, it will be understood that the invention may be embodied otherwise without departing from such principles.

What is claimed is:

1. A disposable urinal screen comprising a foraminous member of material capable of retaining liquid within its structure, and a hardenable deodorant solution retained within said structure and stiffening said member.

2. A disposable urinal screen, as claimed in claim 1, in which the material of said screen is a porous material.

3. A disposable urinal screen, as claimed in claim 2, in which the material of said screen is a sponge material.

4. A disposable urinal screen, as claimed in claim 2, in which the material of said screen is a foamed material.

5. A disposable urinal screen, as claimed in claim 1, in which said screen is a reticulated structure whose intersecting elements are formed to retain said solution.

6. A disposable urinal screen, as claimed in claim 5, in which the intersecting elements of said reticulated structure are tubes.

7. A disposable urinal screen, as claimed in claim 6, in which said tubes are formed with longitudinally extending series of openings therealong establishing communication between the interior and exterior surfaces of said tubes for entry of the solution into said tubes.

8. A disposable urinal screen, as claimed in claim 5, in which the elements of said reticulated structure are relatively elongated and have channels extending longitudinally thereof to retain said solution.

9. A disposable urinal screen, as claimed in claim 1, in which the material of said sheet is an absorbent material.

10. A disposable urinal screen, as claimed in claim 9, in which said absorbent material is wood pulp.

11. A disposable urinal screen, as claimed in claim 9, in which said absorbent material comprises essentially wood fibre.

References Cited by the Examiner

UNITED STATES PATENTS

| | | | |
|---|---|---|---|
| 487,130 | 11/1892 | Schoen | 4—109 |
| 675,947 | 6/1901 | Hach | 4—109 |
| 1,186,345 | 6/1916 | Sleight | 4—109 |
| 2,211,970 | 8/1940 | Fischer | 4—109 |
| 2,544,341 | 3/1951 | McGraw | 4—109 |
| 3,170,169 | 2/1965 | Clark | 4—109 |

LAVERNE D. GEIGER, *Primary Examiner.*

H. ARTIS, *Assistant Examiner.*